(12) United States Patent
Tremelling et al.

(10) Patent No.: US 10,594,190 B2
(45) Date of Patent: Mar. 17, 2020

(54) ELECTRICAL MACHINE ROTORS

(71) Applicant: ABB Research, Ltd., Zurich (SE)

(72) Inventors: Darren D. Tremelling, Apex, NC (US); Yujing Liu, Ojersjo (SE)

(73) Assignee: ABB Schweiz AG, Baden (CH)

( * ) Notice: Subject to any disclaimer, the term of this patent is extended or adjusted under 35 U.S.C. 154(b) by 56 days.

(21) Appl. No.: 16/030,173

(22) Filed: Jul. 9, 2018

(65) Prior Publication Data

US 2018/0316245 A1 Nov. 1, 2018

Related U.S. Application Data

(62) Division of application No. 14/432,918, filed as application No. PCT/US2013/059719 on Sep. 13, 2013, now Pat. No. 10,033,250.

(Continued)

(51) Int. Cl.
| | |
|---|---|
| *H02K 9/00* | (2006.01) |
| *H02K 9/19* | (2006.01) |
| *H02K 1/32* | (2006.01) |
| *H02K 1/27* | (2006.01) |
| *H02K 7/09* | (2006.01) |
| *H02K 15/03* | (2006.01) |

(52) U.S. Cl.
CPC ............... *H02K 9/19* (2013.01); *H02K 1/278* (2013.01); *H02K 1/2786* (2013.01); *H02K 1/32* (2013.01); *H02K 7/09* (2013.01); *H02K 15/03* (2013.01); *Y10T 29/49012* (2015.01)

(58) Field of Classification Search
CPC ......... Y10T 29/49009; Y10T 29/49012; Y10T 29/4994; H02K 9/19; H02K 1/32; H02K 5/20; H02K 1/20; H02K 1/278
See application file for complete search history.

(56) References Cited

U.S. PATENT DOCUMENTS

| | | |
|---|---|---|
| 4,171,494 A | 10/1979 | Yamaguchi |
| 4,238,700 A | 12/1980 | Vinokurov |
| (Continued) | | |

FOREIGN PATENT DOCUMENTS

| | | |
|---|---|---|
| EP | 0903835 | 3/1999 |
| EP | 1953896 | 6/2008 |
| (Continued) | | |

OTHER PUBLICATIONS

Andreas Binder, Tobias Schneider and Markus Kholr, "Fixation of Buried and Surface-Mounted Magnets in High-Speed Permanent-Magnet Synchronous Machines," IEEE Transactions on Industry Applications, vol. 42, No. 4. Jul./Aug. 2006, pp. 1031-1037. Jul. 1, 2006.

(Continued)

*Primary Examiner* — Thanh Lam
(74) *Attorney, Agent, or Firm* — Taft Stettinius & Hollister; J. Bruce Schelkopf

(57) ABSTRACT

Rotors for electrical machines and methods of fabricating the same are disclosed. Electrical machine rotors may include a hollow non-magnetic shaft, an active region, and a plurality of coolant passages extending within the active region. The hollow non-magnetic shaft may extend along an axis and have an exterior surface that defines a shaft space extending along the axis. At least a portion of the active region may be disposed within the shaft space.

20 Claims, 8 Drawing Sheets

Related U.S. Application Data

(60) Provisional application No. 61/708,307, filed on Oct. 1, 2012.

(56) References Cited

U.S. PATENT DOCUMENTS

| | | | |
|---|---|---|---|
| 4,505,031 A * | 3/1985 | Colwell | H02K 5/1677 29/596 |
| 4,930,201 A * | 6/1990 | Brown | H02K 1/278 29/447 |
| 5,489,810 A | 2/1996 | Ferreira | |
| 5,851,152 A | 12/1998 | Ilzhofer | |
| 6,194,852 B1 | 2/2001 | Lovatt | |
| 6,504,247 B2 | 1/2003 | Bunker | |
| 6,879,069 B1 | 4/2005 | Weidman | |
| 7,906,881 B2 * | 3/2011 | Enomoto | H02K 15/03 310/156.43 |
| 8,294,319 B2 * | 10/2012 | Shibui | H02K 7/04 29/598 |
| 2002/0135249 A1 | 9/2002 | Canders | |
| 2006/0043811 A1 | 3/2006 | Ong | |
| 2007/0075596 A1 | 4/2007 | Hall | |
| 2010/0019589 A1 | 1/2010 | Saban | |
| 2010/0019590 A1 | 1/2010 | Guedes-Pinto | |
| 2010/0117473 A1 | 5/2010 | Masoudipour | |
| 2011/0247196 A1 * | 10/2011 | Andersen | B21C 37/0803 29/598 |
| 2012/0049686 A1 | 3/2012 | Mizuike | |
| 2014/0368064 A1 | 12/2014 | Fedoseyev | |
| 2015/0042185 A1 | 2/2015 | Buttner | |

FOREIGN PATENT DOCUMENTS

| | | |
|---|---|---|
| FR | 2829311 | 9/2001 |
| JP | 61073559 | 4/1986 |
| JP | 3670494 | 7/2005 |
| JP | 200134839 | 7/2005 |
| WO | 9502270 | 1/1995 |
| WO | 2009146189 | 12/2009 |

OTHER PUBLICATIONS

L. Petkovska and G. Cvetkovski, "Soft Magnetic Composite Core—A New Perspective for Small AC Motors Design" Ss. Cyril and Methodius University Faculty of Electrical Engineering and Information Technologies, Skopje, Macedonia, 2013. Jan. 1, 2013.

Siemens AG, "Motors with the highest power ratings to meet the highest demands," www.siemens.com/large-drives, Siemens AG 2008. Jan. 1, 2013.

Severin Turk, International Searching Authority (ISA/EPO), International Search Report and Written Opinion for corresponding International Application No. PCT/US2013/059719, European Patent Office, dated Mar. 3, 2015. Mar. 3, 2015.

* cited by examiner

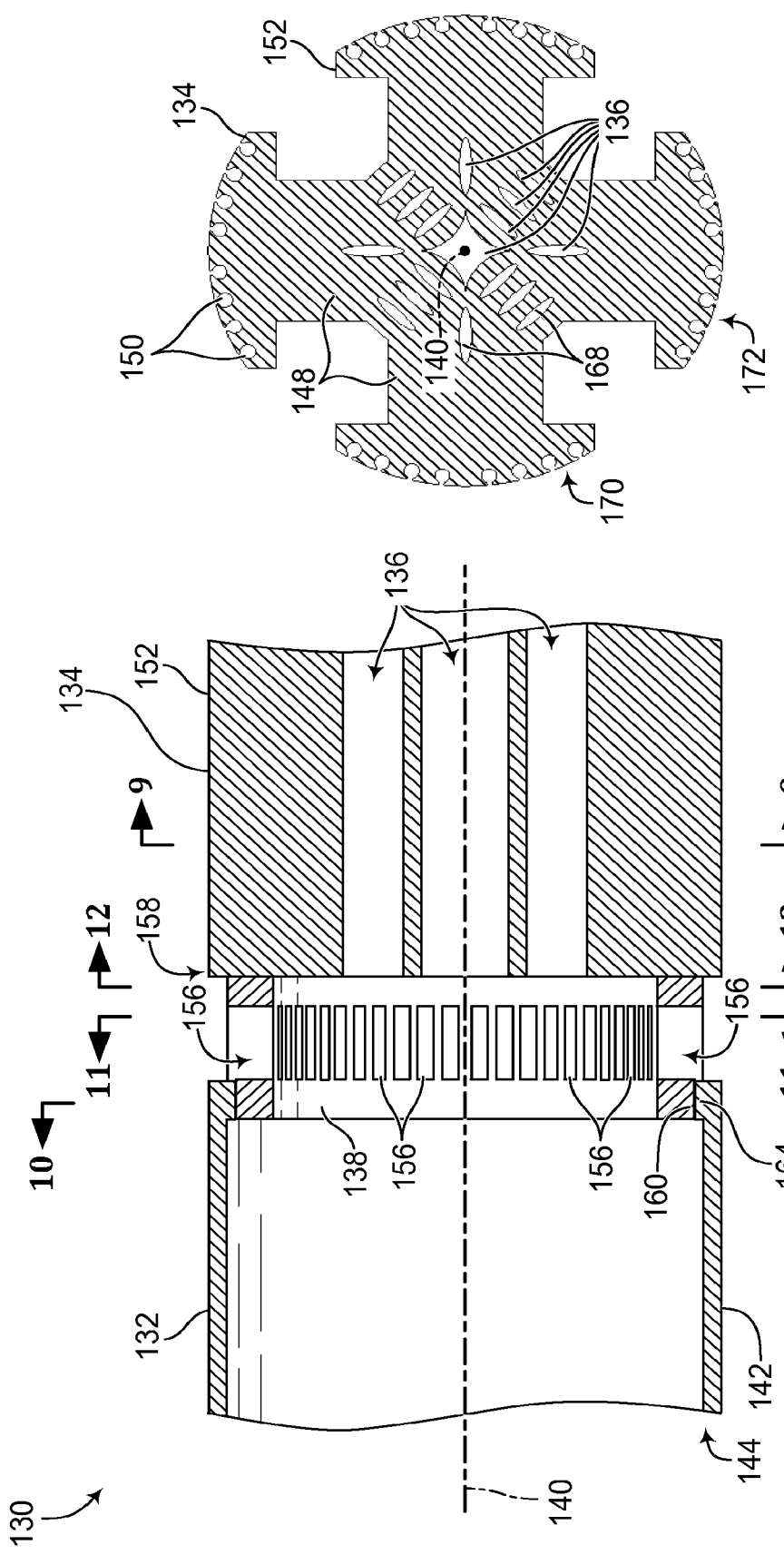

ELECTRICAL MACHINE ROTORS

CROSS REFERENCE TO RELATED APPLICATION(S)

This application is a divisional of U.S. patent application Ser. No. 14/432,918 filed Apr. 1, 2015 which is a 35 U.S.C. § 371 national phase of International Application No. PCT/US2013/059719 claims the benefit of and priority to U.S. Provisional Patent Application Ser. No. 61/708,307, which was filed on 1 Oct. 2012 and is entitled "ELECTRICAL MACHINE ROTORS." The complete disclosures of the above-identified patent applications are hereby incorporated by reference for all purposes.

FIELD OF THE DISCLOSURE

The present disclosure relates to electrical machines, and more particularly to electrical machine rotors.

BACKGROUND

During operation of electrical machines, including permanent magnet electrical machines, generated heat, such as due to losses induced in the magnets from space and time harmonics, needs to be dissipated. For example, limited temperature capabilities and/or temperature sensitivity of the magnets used in permanent magnet machines means that heat dissipation should be sufficient to maintain the magnets within acceptable temperature ranges and/or limit temperature variations between parts and/or regions of the machine.

In electrical machines with solid rotors, the loss-generated heat may be conducted through the rotor to the rotor surface for dissipation by convection to the ambient or airgap air. However, the airgap air may be of a relatively high temperature such as to provide a limited route for heat dissipation, and the portions of the shaft that may be exposed to ambient air may have a relatively long and/or otherwise inefficient heat flow or conduction paths.

Examples of electrical machine rotors are disclosed in U.S. Pat. Nos. 4,028,573; 6,452,301 and 7,619,342; in International Publication Nos. WO2007/110282 and WO2011/012131; and in Japanese published patent application JP2006-158008A. Examples of composite shafts, armatures and tubes are disclosed in U.S. Pat. Nos. 3,623,220; 5,851,152; 6,072,252; 7,323,509 and 7,617,582; and in European Patent Application Publication No. 0577409A1. The disclosures of these and all other publications referenced herein are incorporated by reference in their entirety for all purposes.

SUMMARY

In some examples, electrical machine rotors may include a hollow non-magnetic shaft, an active region, and a plurality of coolant passages extending within the active region. The hollow non-magnetic shaft may extend along an axis and have an exterior surface that defines a shaft space extending along the axis. At least a portion of the active region may be disposed within the shaft space.

In some examples, methods of fabricating rotors for electrical machines may include providing a hollow non-magnetic shaft extending along an axis and having an interior surface defining an interior, inserting a plurality of magnets into the interior of the shaft, arranging the magnets around the interior surface to define a central region extending along the axis, inserting a backiron package into the central region, and radially and plastically expanding the backiron package to urge and preload the magnets against the interior surface of the shaft.

BRIEF DESCRIPTION OF DRAWINGS

FIG. 8 is a longitudinal axial section partial view of another nonexclusive illustrative example of an electrical machine rotor.

FIG. 9 is a cross-section of the electrical machine rotor of FIG. 8, taken generally along line 9-9 in FIG. 8.

DETAILED DESCRIPTION

Figure 1:
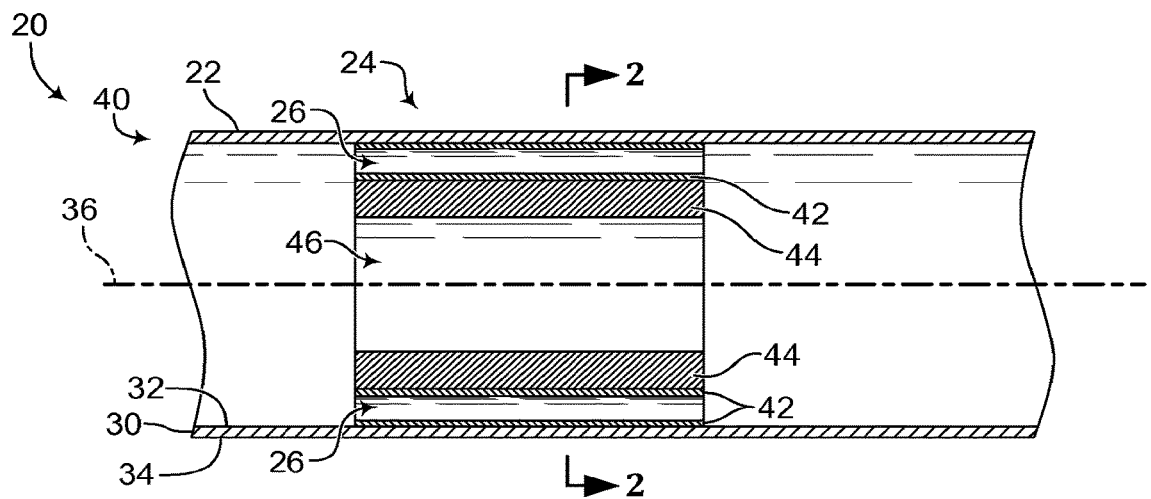
FIG. 1 is a longitudinal axial section partial view of a nonexclusive illustrative example of an electrical machine rotor.
Figure 2:
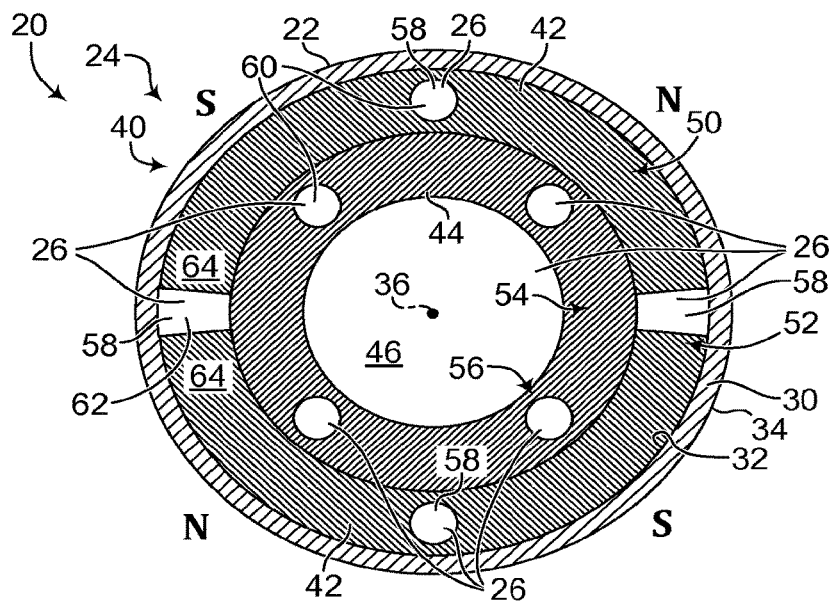
FIG. 2 is a cross-section of the electrical machine rotor of FIG. 1, taken generally along line 2-2 in FIG. 1, and schematically illustrating nonexclusive illustrative examples of coolant passages extending through the active region of the rotor.

A nonexclusive illustrative example of an electrical machine rotor is shown generally at 20 in FIGS. 1 and 2. Unless otherwise specified, the electrical machine rotor 20 may, but is not required to, contain at least one of the structures, components, functionalities, and/or variations described, illustrated, and/or incorporated herein. In the illustrated example, the electrical machine rotor 20 includes a hollow non-magnetic shaft 22, an active region 24, and a plurality of coolant passages 26 extending within the active region. The electrical machine rotor 20 may be used in any suitable type of electrical machine, such as inner rotor electrical machines, nonexclusive illustrative examples of which may include permanent magnet machines, synchronous reluctance machines, and permanent magnet assisted synchronous reluctance machines.

In some examples, the hollow non-magnetic shaft 22 may be a fiber-reinforced composite shaft, such as where it is fabricated from or includes a fiber-reinforced composite material. For example, the hollow non-magnetic shaft 22 may be fabricated at least partially or even substantially completely from a suitable fiber-reinforced composite material. The shaft may be a fiber-reinforced composite shaft that is fabricated from a fiber-reinforced composite material that includes a plurality of suitable reinforcing fibers embedded in a suitable matrix. In some examples, the hollow non-magnetic shaft 22 may have been fabricated substantially completely from a fiber-reinforced composite material that includes a suitable matrix material having suitable reinforcing fibers embedded therein. In some examples, a fiber-reinforced hollow non-magnetic shaft may comprise a shaft fabricated from a suitable nonmagnetic material with the shaft having been reinforced with one or more layers of suitable reinforcing fibers, which fibers may have been embedded in a suitable matrix material.

Nonexclusive illustrative examples of suitable fibers for a fiber-reinforced composite hollow non-magnetic shaft 22 include carbon, aramid (such as Kevlar®), glass, polyester, polyethylene (such as Spectra®), quartz, basalt, boron, aluminum and other types of fibers. A particular type of fiber, or combination of fiber types, may be selected such that the shaft 22 possesses or provides one or more desired material properties, such as high strength or high modulus, and/or a low coefficient of thermal expansion. In some examples, the shaft 22 may be fabricated using high modulus, or even ultrahigh modulus, carbon fibers, such as those having a modulus greater than about 350 GPa, greater than about 450 GPa or even greater than about 500 GPa.

Nonexclusive illustrative examples of suitable matrix materials for a fiber-reinforced composite hollow non-magnetic shaft 22 include inorganic and organic polymers, including thermoplastic and thermosetting resins, such as epoxies and other cross-linking polymer resins. In some examples, one or more filler materials may be added to, or included in, the matrix material, such as to provide desired mechanical, thermal and/or electrical properties. For example, boron nitride or aluminum oxide particles may be added to, or included in, the matrix material.

In some examples, at least a portion of the shaft 22 may be fabricated by filament or tape winding a suitable filament or tape of fibers onto a suitable mandrel, which may be substantially cylindrical, to form the wall 30 of the shaft 22. The fibers of the filament or tape may be coated with resin during the winding process or the filament or tape may be in a "pre-preg" form, with fibers that are pre-impregnated with uncured or partially cured resin. In some examples, at least a portion of the shaft 22 may be fabricated by wrapping or laying-up sheets or plies of woven and/or unidirectional fibers, which may be in pre-preg form, onto the mandrel and/or onto previously filament or tape wound fibers, such as is described in International Application No. PCT/US2012/054183, the complete disclosure of which is incorporated by reference in its entirety for all purposes. As may be understood, the interior surface 32 of the shaft 22 may be formed by the exterior surface of the mandrel, which may result in a relatively smooth finish for the interior surface 32. The exterior surface 34 of the shaft 22 may retain its as-wound or as-wrapped surface finish and/or it may be processed to provide a predetermined degree of smoothness and/or roundness. For example, the exterior surface 34 of the shaft 22 may be turned or machined after hardening or curing the matrix material to provide a predetermined degree of smoothness and/or roundness. In some examples, the exterior surface may be provided with a finish having a predetermined degree of smoothness and/or roundness during a curing process, such as through use of a wrap applied to the tube for and/or during a curing process.

In some examples, at least a portion of the shaft 22 may be fabricated by a pultrusion process in which woven and/or unidirectional fibers are pulled through a suitable resin and through a heated die to form the shaft.

As may be understood, the mechanical properties of the shaft 22, when fabricated at least partially from a fiber-reinforced composite material, may be selected, tuned or adjusted by using suitable combinations of fiber orientations. In particular, inclusion of fibers that are more closely parallel to an axis 36 of the shaft 22, or are substantially axially aligned, may provide or improve lateral stiffness or bending resistance, inclusion of fibers that are obliquely oriented, helical or skew relative to the axis of the shaft 22, or off-axis, may provide or improve torsional stiffness, while inclusion of fibers that are more closely circumferentially oriented or transverse relative to the axis of the shaft 22 may provide or improve the shaft's hoop strength or resistance to lateral compression or buckling. By way of a nonexclusive illustrative example, fibers may be considered to be: substantially axially aligned when the fibers are oriented at an angle of less than about plus or minus ten degrees (±10°) relative to a line parallel to the axis 36 of the shaft 22, obliquely or helically oriented or skew when the fibers are oriented at an angle of between about plus or minus ten degrees (±10°) and about plus or minus eighty degrees (±80°) relative to a line parallel to the axis of the shaft 22, and circumferentially oriented or transverse when the fibers are oriented at an angle of between about plus or minus eighty degrees (±80°) and about ninety degrees (90°) relative to a line parallel to the axis of the shaft 22. In some nonexclusive illustrative examples, the shaft 22 may include a suitable combination of: fibers that are substantially axially-aligned or at approximately zero degrees (0°) relative to a line parallel to the axis of the shaft, fibers that are oriented or wrapped at an angle of about plus or minus forty-five degrees (±45°) relative to a line parallel to the axis of the shaft, and/or fibers that are oriented or wrapped at an angle of about ninety degrees (90°) relative to a line parallel to the axis of the shaft.

As may be understood, a solid metal shaft for an electrical machine having a particular torque and/or power rating may be replaced with a larger diameter hollow shaft because the larger diameter hollow shaft may provide similar or even increased strength and/or stiffness. Furthermore, fabricating an increased diameter hollow shaft at least partially or even completely from a fiber-reinforced composite material may provide a cost effective approach to increasing shaft diameter, strength and/or stiffness, reducing shaft weight, and/or providing, supporting and/or enhancing the heat dissipating ability of the rotor. In contrast to solid-shafted electrical machines, permanent magnet electrical machines having a hollow non-magnetic shaft, which may be at least partially fabricated or formed from a fiber-reinforced composite material, may support or permit cooling the rotor from inside the rotor and/or from inside the shaft, such as by way of coolant flow or airflow within or through the rotor or its shaft space, as will be more fully discussed below.

As shown in FIGS. 1 and 2, the hollow non-magnetic shaft 22 extends along the axis 36 and has an outside diameter corresponding to its exterior surface 34, wherein the exterior surface 34 defines a shaft space 40 extending along the axis 36. As used herein, the "shaft space" may or may not be axially coextensive or coterminous with the axial extent of the shaft. In some examples, the axial length of the shaft may correspond to the axial length of the shaft space. In some examples, the axial length of the shaft space may be longer, or even substantially longer, than the axial length of the actual shaft and may extend beyond one or both ends of the shaft. By way of a nonexclusive illustrative example, some rotors may include a pair of shafts that extend from opposite ends of the active region 24, with the shaft space encompassing the extended and continuous region of space having a radial extent defined by the outside diameter of one or both of the two shafts and extending along the axis over the lengths of the two shafts and the active region therebetween.

At least a portion of the active region 24 may be disposed within the shaft space 40. As shown in FIGS. 1 and 2, the active region 24 may be substantially completely radially disposed within the shaft space 40 in some nonexclusive illustrative examples of the rotor 20.

The active region 24 may be an electromagnetically active region that includes any suitable combination and/or arrangement of suitable components, such as may be appropriate for a particular type of electrical machine. Nonexclusive illustrative examples of suitable components for the active region 24 include, without limitation, permanent magnets, copper conductors, aluminum conductors, electrical steel, and the like. In the nonexclusive illustrative example shown in FIGS. 1 and 2, the active region 24 includes a magnet portion 42, which may comprise a plurality of permanent magnets, and a backiron 44. In some examples, the backiron 44 may be in the form of a suitably configured backiron package. As shown in the nonexclusive illustrative example presented in FIGS. 1 and 2, the active region 24 may be a substantially annular structure arranged around and/or along the axis 36 and having a central opening 46 that extends through the active region along the axis 36.

The particular configurations of magnet portion 42 illustrated in FIG. 2, including the permanent magnets thereof, should be understood as a schematic representation. In particular, the magnet portion 42 may be fabricated from any suitable number and configuration of individual permanent magnets arranged to form an overall generally or substantially annular region of permanent magnets. Thus, the magnet portion 42 illustrated in FIGS. 1 and 2 may include any suitable number or combination of individual permanent magnets, and/or layers of permanent magnets, arranged at least partially around the interior surface of the shaft 22.

The permanent magnets may be arranged, oriented and/or configured to provide a suitable number of magnetic poles for the rotor 20. As shown in FIG. 2, the magnet portion 42 may be configured to provide four poles or two north-south pole pairs, as generally indicated by the letters "N" and "S" in FIG. 2. Although illustrated with two pole pairs it is within the scope of the present disclosure for the magnet portion 42 to have any suitable number of poles or pole pairs, such as three pole pairs, or even four or more pole pairs.

In some examples, the permanent magnets may be arranged in a Halbach array, a Halbach cylinder, and/or portion or portions thereof, where the spatial direction of the magnetization vector rotates about the circumference of the shaft or a cylinder formed by the magnets. When the permanent magnets are arranged in a Halbach array or cylinder, the backiron could be decreased in thickness, omitted from the machine, or at least partially replaced with additional permanent magnets, which may result in an increased flux density across the air gap of the machine.

The permanent magnets may be fabricated from any suitable material, and may be chosen to achieve any suitable combination of electromagnetic, physical, and/or thermal properties. Nonexclusive illustrative examples of suitable permanent magnet materials include neodymium, samarium cobalt, or other high energy product magnetic materials.

The coolant passages 26 may be or include any suitable structure, feature or combination thereof, such as conduits, tubes, ducts, channels, apertures, openings, gaps, orifices, holes or voids, that is or are configured to permit or support the circulation, movement or flow of a suitable coolant fluid, such as air or other low density coolant fluid, through the coolant passages. At least some of the coolant passages 26 may extend substantially adjacent to, or even at least partially through, at least a portion of the active region 24. For example, at least some of the coolant passages 26 may extend substantially adjacent to, or even at least partially through, suitable structures and/or components within the active region 24, such as permanent magnets, copper conductors, aluminum conductors, electrical steel, or the like. As shown in the nonexclusive illustrative example presented in FIGS. 1 and 2, at least some of the coolant passages 26 may extend substantially adjacent to, or even at least partially through, at least a portion of the backiron 44, the magnet portion 42 and/or at least one of the permanent magnets of the magnet portion 42. As may be understood, the coolant passages 26 may provide an effective increase in heat dissipating surface area within or for the magnets and/or the backiron. Accordingly, the coolant passages 26 may permit coolant flow in close thermal proximity to the structures and/or components of the active region 24, which may provide an improved heat dissipation ability for the rotor, even when used with low density coolant fluids such as air or other cooling gases. Thus, inclusion of the coolant passages 26 extending within the active region 24 and within the shaft space 40 may limit or even reduce temperature rises within the rotor and/or its various components that would otherwise result from equivalent losses.

In some examples, inclusion of the coolant passages 26 extending within the active region 24 and within the shaft space 40 may provide a rotor with sufficiently high heat dissipating ability that the magnets may be allowed to incur greater losses than would otherwise be permissible, while maintaining acceptable temperatures or temperature rises in the magnets. For example, magnet losses could be allowed to increase by reducing the amount of magnet segmentation, allowing greater total harmonic distortion in the converter current feeding the machine, and/or by utilizing different stator winding configurations. Such allowances may allow for reducing magnet machining costs, reducing the converter cost, and/or increasing the power and/or torque rating for the machine. Furthermore, because the rotor losses for a given machine increase in proportion to the square of the rotor speed, inclusion of the coolant passages 26 extending within the active region 24 and within the shaft space 40 may permit higher speed machines.

In some examples, the amount of losses may be balanced against the available heat dissipating ability, such as due to the presence of the coolant passages 26, so as to limit the incurred temperature rise of the rotor and/or to limit temperature variations between various parts of the electrical machine. As may be understood, such limited temperature rises and/or variations may reduce thermal strains that may result due to differing coefficients of thermal expansion for various components of the electrical machine.

As shown in FIGS. 1 and 2, at least some of the passages 26 may be substantially axially aligned and extend through the active region 24 and within the shaft space 40 substantially parallel to the axis 36 of the rotor. In some examples, at least some of the passages may be extended helically or skew relative to the axis, which may reduce harmonics in the voltage output of the machine.

In some examples, the particular locations and/or geometry of the coolant passages 26 within the magnet portion 42 and/or the back iron 44 of the active region 24 may correspond to magnetic and/or material optimization within the active region. In particular, relatively less important and/or excess portions of the magnet portion 42 and/or the back iron 44, such as those portions having relatively lower magnetic flux therethrough, may be omitted or removed from the magnet portion 42 and/or the back iron 44 so as to form and/or provide at least some of the coolant passages 26. For example, at least some of the coolant passages 26 may extend through reduced flux density portions of the active region 24, such as through reduced flux portions of the magnet portion 42 and/or reduced flux portions of the back iron 44. In particular, as may be understood, the active region 24 may include both higher flux density portions and reduced flux density portions, where the reduced flux density portions have a lower magnetic flux density than the higher flux density portions. For example, the magnet portion 42 may include higher flux density portions 50 proximate the poles and reduced flux density portions 52 in the interpole portions. The backiron 44 may correspondingly include higher flux density portions 54 in the interpole portions and reduced flux density portions 56 proximate the poles. As shown in FIG. 2, at least some of the passages may extend through interpole portions of the active region, such as where the passages 58 extend through the reduced flux density interpole portions of magnet portion 42. The central opening 46, which may provide an additional or alternative coolant passage, may correspond to what would otherwise be a reduced flux portion of the backiron or, in the absence of a backiron, of the magnet portion, at and around the axis of the rotor.

As may be further understood, omitting or removing portions of the magnet portion 42 and/or the back iron 44 may also reduce the weight of the rotor and reduce the associated material costs.

The coolant passages 26 may be formed through or within the magnet portion 42 and/or the back iron 44 using any suitable fabrication process or combination of processes. For example, at least some of the coolant passages 60 may be formed substantially through a single magnet and/or through a single piece or lamination of the backiron, either during fabrication of the magnet or backiron or by way of a subsequent operation. At least some of the coolant passages 26 may be formed between adjacent magnets, adjacent portions of the backiron, and/or between a magnet and the backiron. For example, a first one of the adjacent parts may be formed or otherwise provided with a suitable channel or indentation extending along a mating surface that will be proximate a corresponding mating surface of a second one of the adjacent parts, such that when the mating surfaces are brought together, the channel or indentation may form a coolant passage extending between the adjacent parts. In some examples, the corresponding mating surfaces of the first and second ones of the adjacent parts may both include channels or indentations thereon. In some examples, at least some of the coolant passages may be formed between adjacent magnets 64 within the magnet portion 42, such as where the coolant passage 62 corresponds to a void where one or more magnets were omitted or removed from the magnet portion 42.

The coolant passages 26 may have any suitable cross-sectional shape, which may, in some examples, correspond to how the particular coolant passages was formed or otherwise created. For example, as shown in FIG. 2, at least some of the coolant passages 60 formed substantially through a single magnet and/or through a single piece or lamination of the backiron, as well as at least some of the coolant passages formed between corresponding mating surfaces of adjacent parts, may have a substantially circular cross-section. In some examples, at least some of the coolant passages 62 formed between adjacent magnets 64 may have a cross-section corresponding to the shape of the omitted or removed element or magnet, as shown in FIG. 2.

As will be discussed in more detail below, FIGS. 3-7 provide schematic representations of nonexclusive illustrative examples of coolant flow through rotors having various shaft and/or active region configurations. For the purposes of clarity, particular coolant passages, some of which may not be visible in the particular cross-section provided, are not explicitly shown in FIGS. 3-7. Thus, when arrows corresponding to the particular coolant flow paths illustrated in FIGS. 3-7 extend across the magnet portions 42 and/or the back irons 44 of the illustrated active regions 24, it should be understood that the arrows schematically represent coolant flow through coolant passages 26 that extend within and/or through the illustrated magnet portions, back irons and/or active regions.

Figure 3:
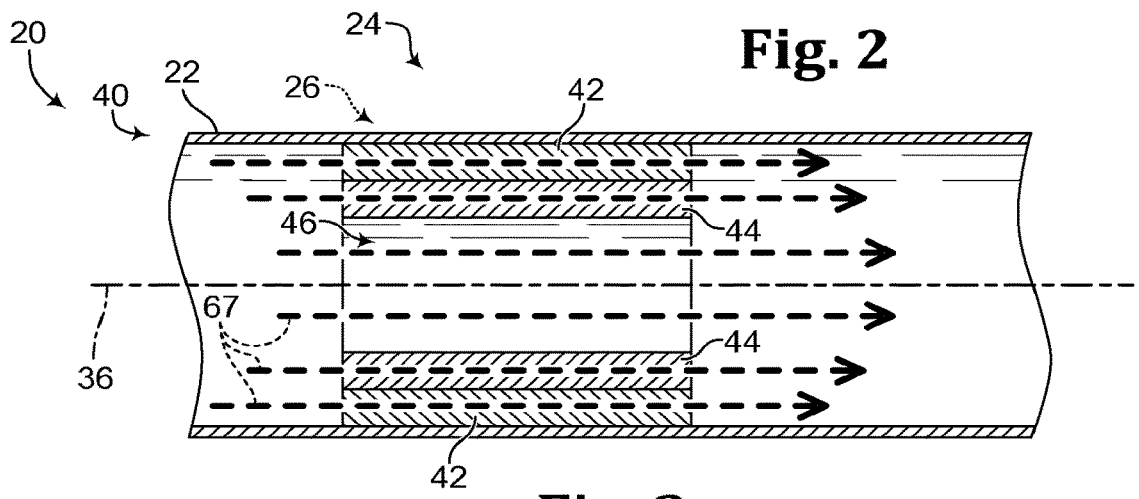
FIG. 3 is a longitudinal axial section partial view of the electrical machine rotor of FIG. 1, shown with a schematic representation of coolant flow therethrough.

A nonexclusive illustrative example of coolant flow through the rotor 20 of FIGS. 1 and 2 is schematically illustrated in FIG. 3. As suggested by the arrows 67 in FIG. 3, at least some of the coolant passages 26 and the central opening 46 are configured to permit substantially axial coolant flow within or even through the active region 24 and within the shaft space 40. In some examples of the rotor 20 illustrated in FIGS. 1-3, both ends of the rotor may be substantially open so as to permit substantially axial flow through the entire length of the rotor, entering through a first end of the shaft, passing through the shaft space and the active portion, and exiting through a second end of the shaft. As may be understood, the coolant flow schematically illustrated in FIG. 3, which passes through the active region 24 in a single direction, may provide an asymmetric coolant within the rotor 20.

Figure 4:
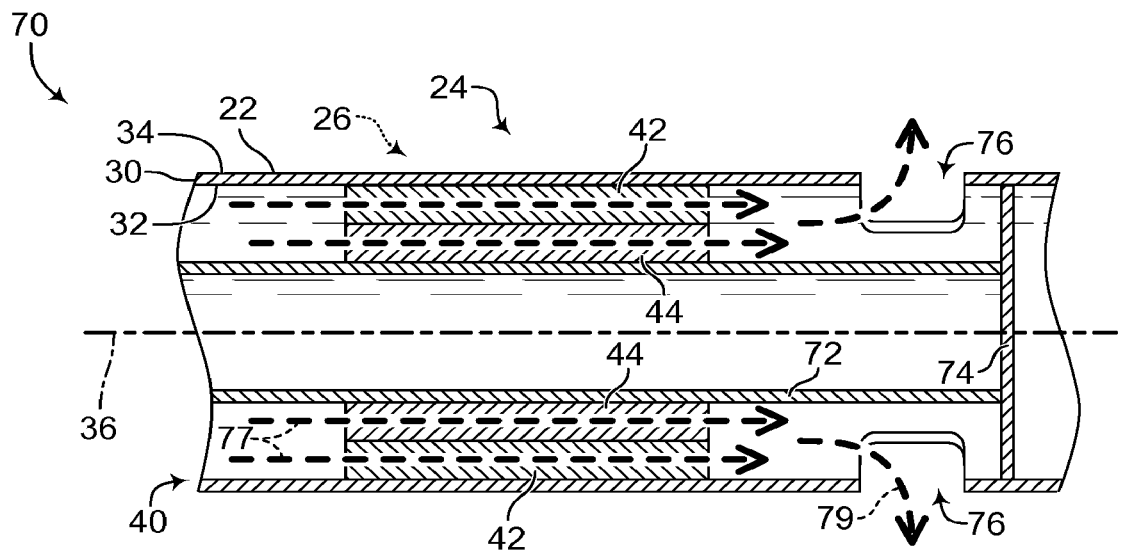
FIG. 4 is a longitudinal axial section partial view of another nonexclusive illustrative example of an electrical machine rotor, shown with a schematic representation of coolant flow therethrough.

Another nonexclusive illustrative example of an electrical machine rotor is shown generally at 70 in FIG. 4. Unless otherwise specified, the electrical machine rotor 70 may, but is not required to, contain at least one of the structures, components, functionalities, and/or variations described, illustrated, and/or incorporated herein. In the illustrated example, the electrical machine rotor 70 includes a hollow non-magnetic shaft 22, an active region 24, a plurality of coolant passages 26 extending within or through the active region, a coaxial inner shaft 72, a shaft end or diverter plate 74, and at least one radial vent or opening 76 extending through the wall 30 from the interior 32 surface to the exterior surface 34. As suggested by the arrows 77, 79 in FIG. 4, the rotor 70 is configured to provide axial coolant flow, entering through a first, open end of the shaft, passing through the shaft space and the active portion, and exiting radially out of the shaft through the openings 76 due to the shaft diverter plate 74, which may prevent axial coolant flow out through the second end of the shaft. As shown in FIG. 4, the coaxial inner shaft 72 may divert substantially all of the coolant flow through the shaft 70 to pass through the magnet portion 42 and the back iron 44 of the active region 24. As may be understood, the coolant flow schematically illustrated in FIG. 4, which passes through the active region 24 in a single direction, may provide an asymmetric coolant within the rotor 70.

In some examples, the coolant flow out from the openings 76 may be directed towards and/or used to assist with cooling various portions of electrical machines into which the rotor 70 may be incorporated. For example, the coolant flow out from the openings 76 may be used to assist with cooling the machine's airgap and/or the stator end windings of the machine.

Figure 5:
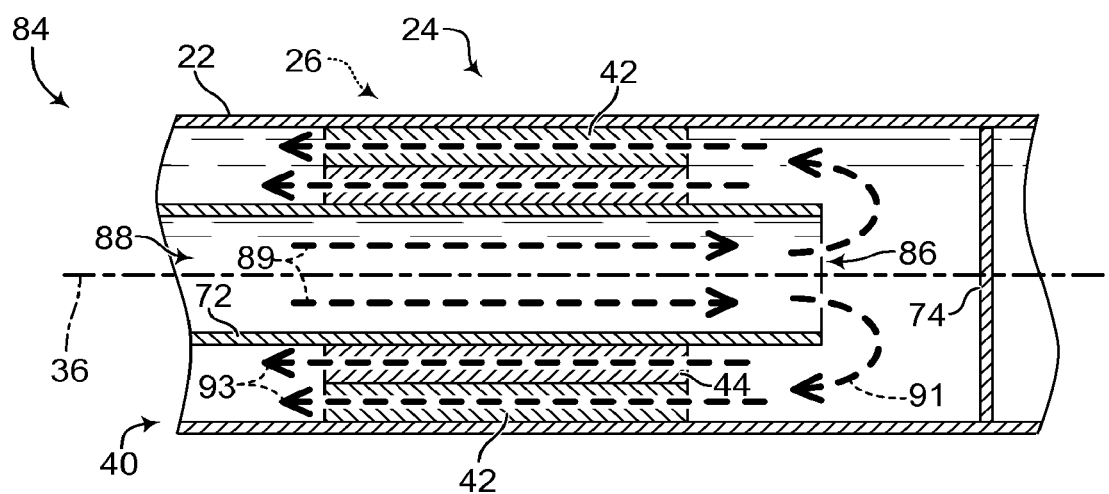
FIG. 5 is a longitudinal axial section partial view of another nonexclusive illustrative example of an electrical machine rotor, shown with a schematic representation of coolant flow therethrough.

Another nonexclusive illustrative example of an electrical machine rotor is shown generally at 84 in FIG. 5. Unless otherwise specified, the electrical machine rotor 84 may, but is not required to, contain at least one of the structures, components, functionalities, and/or variations described, illustrated, and/or incorporated herein. In the illustrated example, the electrical machine rotor 84 includes a hollow non-magnetic shaft 22, an active region 24, a plurality of coolant passages 26 extending within or through the active region, a shaft end or diverter plate 74, and a coaxial inner shaft 72 having an interior passage 88 and an open end 86, which may be proximate the shaft diverter plate. As suggested by the arrows 89, 91, 93 in FIG. 5, the rotor 84 is configured to provide circulating coolant flow that enters through the interior passage 88, passes through the open end 86 of the coaxial inner shaft, reverses direction, such as due to the shaft diverter plate 74, and passes through the magnet portion 42 and the back iron 44 of the active region 24 within the shaft space 40. As may be understood, the coolant flow schematically illustrated in FIG. 5, which passes through the active region 24 in a single direction, may provide an asymmetric coolant within the rotor 84.

Figure 6:
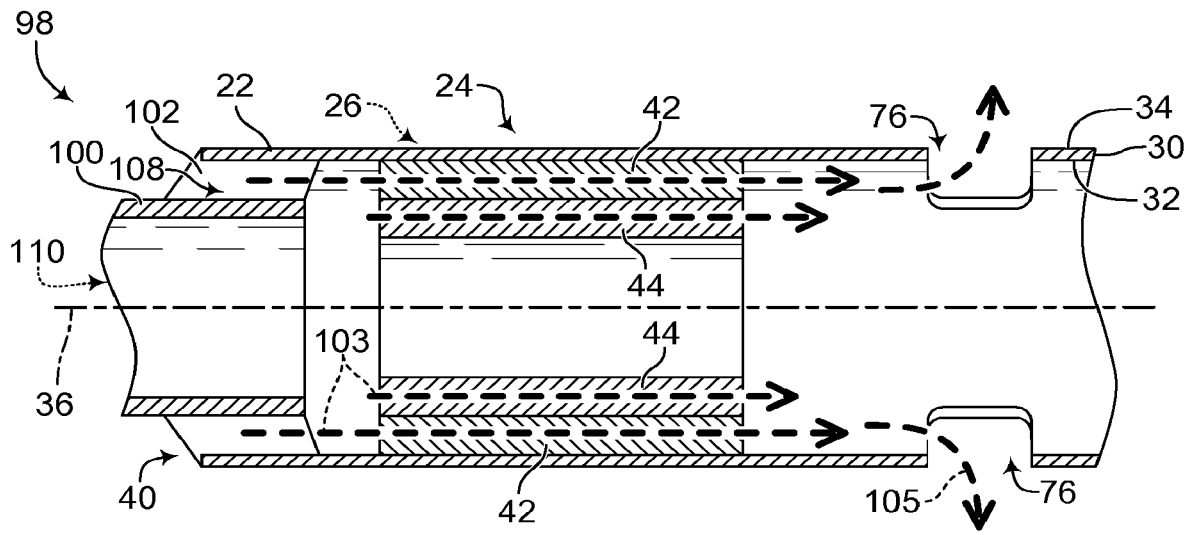
FIG. 6 is a longitudinal axial section partial view of another nonexclusive illustrative example of an electrical machine rotor, shown with a schematic representation of coolant flow therethrough.

Another nonexclusive illustrative example of an electrical machine rotor is shown generally at 98 in FIG. 6. Unless otherwise specified, the electrical machine rotor 98 may, but is not required to, contain at least one of the structures, components, functionalities, and/or variations described, illustrated, and/or incorporated herein. In the illustrated example, the electrical machine rotor 98 includes a hollow non-magnetic shaft 22, an active region 24, a plurality of coolant passages 26 extending within or through the active region, a coaxial inner stub shaft 100, and at least one radial vent or opening 76 extending through the wall 30 from the interior 32 surface to the exterior surface 34.

As shown in FIG. 6, the coaxial inner stub shaft 100 may be joined to and/or support the hollow non-magnetic shaft 22 by way of a suitable joining or connecting structure, such as the fins 102. The fins 102 may be substantially axially aligned, or in some examples, configured as a fan-like structure with an approximately helical configuration configured to assist with coolant flow. In some examples, the joining or connecting structure may include or comprise a honeycomb, lattice or other arrangement configured to transmit torque between the shaft 22 and the inner stub shaft 100.

As suggested by the arrows 103, 105 in FIG. 6, the rotor 98 is configured to provide axial coolant flow, entering through the opening 108 between the shaft 22 and the inner stub shaft 100, passing through the magnet portion 42 and the back iron 44 of the active region 24 within the shaft space 40, and exiting radially out of the shaft through the openings 76 and/or the through end of the shaft. In some examples, a shaft diverter plate or other obstruction may be provided to support the radial flow through the openings 76. As may be understood, the coolant flow schematically illustrated in FIG. 6, which passes through the active region 24 in a single direction, may provide an asymmetric coolant within the rotor 98.

In some examples, the rotor 98 may include an axial fan 110, which may be integrated within the inner stub shaft 100. By way of nonexclusive illustrative example, the fan 110 may be segmented axially, for scalability, and may be or include an extruded helix structure.

Figure 7:
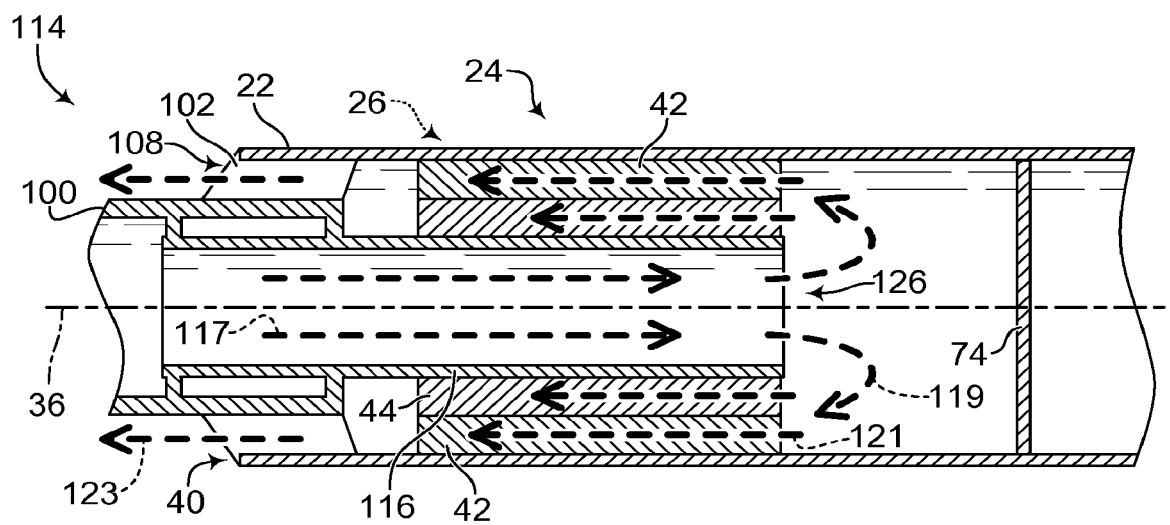
FIG. 7 is a longitudinal axial section partial view of another nonexclusive illustrative example of an electrical machine rotor, shown with a schematic representation of coolant flow therethrough.

Another nonexclusive illustrative example of an electrical machine rotor is shown generally at 114 in FIG. 7. Unless otherwise specified, the electrical machine rotor 114 may, but is not required to, contain at least one of the structures, components, functionalities, and/or variations described, illustrated, and/or incorporated herein. In the illustrated example, the electrical machine rotor 114 includes a hollow non-magnetic shaft 22, an active region 24, a plurality of coolant passages 26 extending within or through the active region, and a coaxial inner stub shaft 100. As shown in FIG. 6, the coaxial inner stub shaft 100 may be joined to and/or support the hollow non-magnetic shaft 22 by way of a suitable joining or connecting structure, such as the fins 102 or other suitable structure, and may include an extension 116 that extends through the active region 24.

As suggested by the arrows 117, 119, 121, 123 in FIG. 7, the rotor 114 is configured to provide a coolant flow that generally exits the rotor from the proximate the end where it was injected. As illustrated in FIG. 7, the coolant flow enters through the inner stub shaft 100 and its extension 116, passes through the open end 126 of the extension 116, reverses direction, such as due to the shaft diverter plate 74, passes through the magnet portion 42 and the back iron 44 of the active region 24 within the shaft space 40, and exits through the opening 108 between the shaft 22 and the inner stub shaft 100. As may be understood, the coolant flow schematically illustrated in FIG. 7, which passes through the active region 24 in a single direction, may provide an asymmetric coolant within the rotor 114.

Another nonexclusive illustrative example of an electrical machine rotor is shown generally at 130 in FIG. 8. Unless otherwise specified, the electrical machine rotor 130 may, but is not required to, contain at least one of the structures, components, functionalities, and/or variations described, illustrated, and/or incorporated herein. In the illustrated example, the electrical machine rotor 130 includes a hollow non-magnetic shaft 132, an active region 134, a plurality of coolant passages 136 extending within the active region, and a connection region 138 disposed between the shaft 132 and the active region 134 and configured to secure the shaft relative to the active region.

As shown in FIG. 8, the hollow non-magnetic shaft 132 extends along an axis 140 and has an outside diameter corresponding to its exterior surface 142, wherein the exterior surface 142 defines a shaft space 144 extending along the axis 140. As may be understood, the shaft space 144 may, in some examples, extend along the axis 140 and beyond at least one end of the shaft 132, such as where the shaft space 144 extends along the axis 140 so as to radially enclose at least a portion, or even substantially all, of the active region 134 of the rotor 130.

As shown in FIG. 9, the active region 134 may include four pole posts 148 that define two pole pairs, such that the rotor 130 is a four-pole wound-field rotor. Although illustrated with two pole pairs it is within the scope of the present disclosure for the active region 134 to have any suitable number of pole pairs, such as three pole pairs, or even four or more pole pairs. As may be understood, windings may be wound around the pole posts 148, and a plurality of copper or aluminum damper bars may be cast into the illustrated openings 150 on the ends of the pole posts.

The active region 134 may include a body 152 that may, in some examples, be fabricated as a steel casting or forging and/or as a plurality of steel laminations. In some examples, as generally shown in FIG. 8, the body 152 may extend for substantially the entire length of the active region 134. In some examples, the active region 134 may comprise a plurality of axially repeating spaced apart segments or stacks of laminated structures, such as those illustrated in FIG. 13 and discussed below. By way of non-limiting example, the spaced apart segments, packets or stacks of laminated structures may each have an axial length or thickness of about 40 mm to about 500 mm, with a void or gap of about 5 mm to about 15 mm between adjacent ones of the spaced apart segments or stacks of laminated structures. In some examples, the spaced apart segments, packets or stacks of laminated structures may each have an axial length or thickness of about 42 mm, with a void or gap of about 8 mm between adjacent ones of the spaced apart segments or stacks of laminated structures. As may be understood, the voids or gaps may provide for or support radial coolant flow between adjacent ones of the spaced apart segments or stacks of laminated structures. Suitable structures, which may be substantially radially oriented, may be provided between adjacent ones of the spaced apart segments or stacks of laminated structures so as to maintain the spacing therebetween. In some examples, such a rotor may be incorporated into an electrical machine where the gaps between adjacent ones of the spaced apart segments or stacks of laminated structures are substantially axially aligned with corresponding vents or passages in a stator, such that radial coolant flow from within the rotor shaft space may cross the machine's air gap and enter the vents or passages in the stator.

Figure 11:
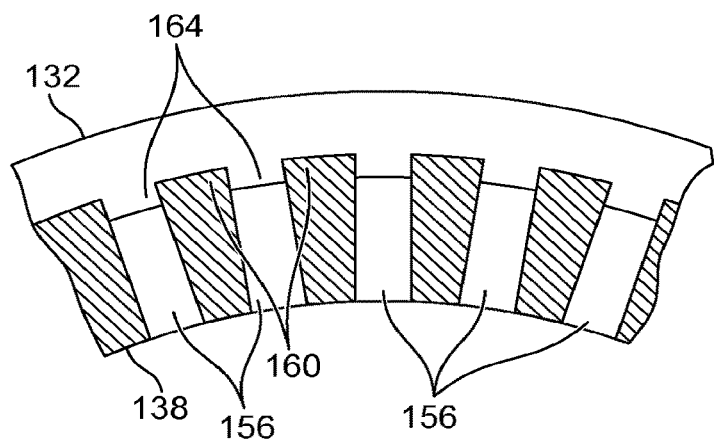
FIG. 11 is a cross-section partial view of the electrical machine rotor of FIG. 8, taken generally along line 11-11 in FIG. 8.
Figure 12:
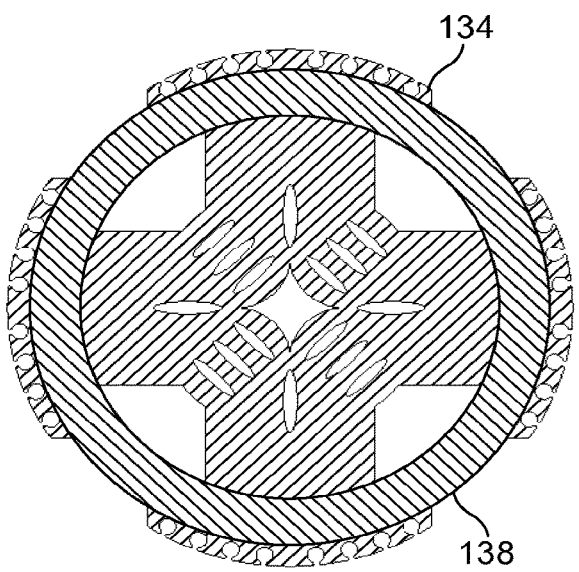
FIG. 12 is a cross-section of the electrical machine rotor of FIG. 8, taken generally along line 12-12 in FIG. 8.

As shown in FIGS. 8 and 11, the connection region 138 may include a plurality of openings 156 extending radially therethrough. As may be understood, the plurality of openings 156 may provide or support radial coolant flow therethrough, such as to provide an inlet or outlet for the coolant flow within the shaft space, such as the coolant flow through the shaft 132 and/or through the coolant passages 136 through the active region 134. As may be understood, such coolant flow through the openings 156 may provide or support cooling for the connection region 138.

In some examples, the rotor 130 may be configured for asymmetric coolant flow therethrough. For example, coolant may enter the shaft 132 through an open end, pass axially through the connection region 138 and through the active region 134 via the coolant passages 136, and then exit through an opposite end of the rotor, such as after passing through a connection region and shaft at the opposite end of the active region 134. In such an example, some or even substantially all, of the coolant flow may exit the rotor 130 by way of the openings 156 in one of the connection regions 138 and/or through voids or gaps between adjacent ones of spaced apart segments or stacks of laminated structure forming the active region if such voids or gaps are present.

In some examples, the rotor 130 may be configured for symmetric coolant flow therethrough. For example, the rotor may include an active portion 134 with shafts 132 joined to each end 158 of the active portion by way of a pair of connection regions 138, with the active region including spaced apart segments or stacks of laminated structure that are separated by voids or gaps between adjacent ones of spaced apart segments or stacks of laminated structure. In such an example, opposed coolant flows may enter through the open ends of both of the pair of shafts, pass into the connection regions 138, with some of the coolant flow exiting through the openings 156. The remainder of the coolant flows would then pass into the active region 134, through the opposite ends 158 thereof, and then exit the rotor 130 through voids or gaps between adjacent ones of spaced apart segments or stacks of laminated structure forming the active region.

In some examples, the connection region 138 may be configured to provide and/or assist coolant flow outside the rotor 130 and/or outside the shaft space 144. For example, radial coolant flow out from the plurality of openings 156 may be directed towards and/or used to assist with cooling various portions of electrical machines into which the rotor 130 may be incorporated, such as the machine's airgap and/or the stator end windings of the machine.

In some examples, the connection region 138 may be substantially integral with the active region 134. For example, the active region 134 may comprise a steel structure or body 148 extending along the axis 140 to an end 158, which may be fabricated from a plurality of laminations, and the connection region 138 may be machined or cast onto the end of the active region.

Figure 10:
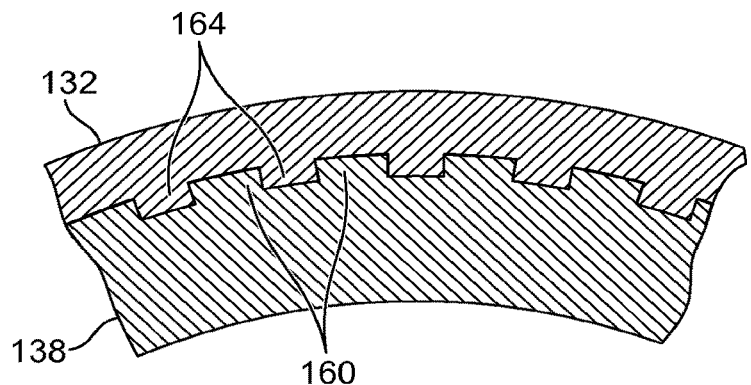
FIG. 10 is a cross-section partial view of the electrical machine rotor of FIG. 8, taken generally along line 10-10 in FIG. 8.

As generally shown in FIGS. 8, 10 and 11, the connection region 138 and the shaft 132 may be correspondingly configured to engage one another, such as to transmit torque and power from the active region to the shaft. As shown in FIGS. 8 and 10, some examples of the connection region 138 may include a plurality splines 160 disposed on at least a portion of the exterior surface of the connection region 138, while the shaft 132 includes a plurality of corresponding splines 164 extending along on its interior surface for at least a portion of the shaft's length, or even for substantially the entire length of the shaft.

The plurality of splines 164 on the interior surface of the shaft 132 may be fabricated or formed using any suitable method. For example, the splines may be machined or broached after the shaft 132 has been fabricated. In some examples where the shaft 132 comprises a fiber-reinforced composite, the splines 164 may be formed during the lay-up process with suitably oriented fibers. For example, prior to filament winding or otherwise placing helically and/or circumferentially oriented fibers onto a mandrel to from the shaft 132, axially oriented fibers may be placed into axially aligned slots or channels on the exterior surface of the mandrel to form splines 164 on the interior surface of the shaft, with the splines 164 comprising axially oriented fibers.

In some examples where the shaft 132 comprises a pultruded fiber-reinforced composite, the splines 164 may be formed during the pultrusion process. For example, while the woven and/or unidirectional fibers forming the walls of the shaft 132 are being pulled through the die, axially oriented fibers may be simultaneously pultruded through suitable notches, cuts or slots in the pultrusion die to form the splines 164 on the shaft 132 with the axially oriented fibers. In some examples, such pultruded splines may extend along substantially the entire length of the shaft. In such examples, in addition to providing for mechanical engagement with the connection region 138, the splines, with their axially oriented fibers, may provide additional lateral stiffness to the shaft.

Although illustrated in FIGS. 8, 10 and 11 with a shaft 132 having a larger diameter such that the shaft fits over the connection region 138, with the shaft having splines on its interior surface, it is within the scope of this disclosure for the connection region 138 to have a larger diameter such that the connection region fits over the shaft 132. In such an example, the connection region would have splines on its interior surface, while the shaft would have splines on its exterior surface.

At least a portion of the active region 134 may be disposed within the shaft space 144, such as where the active region 134 is substantially completely disposed within approximately the shaft space 144, as shown in FIG. 8. As shown in FIG. 8, the nominal or outside diameters of the rotor active region 134 and the shaft 132 may be approximately the same, such as where the nominal or outside diameters are within about 5-10% of each other. However, in some examples, rotor active region 134 and the shaft 132 may have different diameters. For example, the shaft 132 may have a larger diameter than the rotor active region 134 such that the rotor active region 134 is completely disposed within the shaft space 144. In some examples, the shaft 132 may have a smaller diameter than the rotor active region 134.

In some examples, at least some of the coolant passages 136 may extend substantially parallel to the axis 140 and have an elongated cross-section transverse to the axis. With reference to FIG. 9, the elongated cross-sections of, for example the passages 168, may be arranged approximately parallel to local magnetic flux lines that would flow between the poles 170, 172 of the active region 134. As may be understood, such an arrangement of elongated cross-section passages 136 may reduce or even minimize the disturbance to the flux lines resulting from the presence of the passages through the active region 134. Furthermore, as may be seen from the arrangement of the coolant passages 136 in FIG. 9, with a plurality of the coolant passages 136 being spaced from the axis 140, such an arrangement provides for relatively close spacing of the coolant passages to where losses occur within the active region, which may increase and/or improve heat flow to the coolant within the coolant passages 136.

Figure 13:
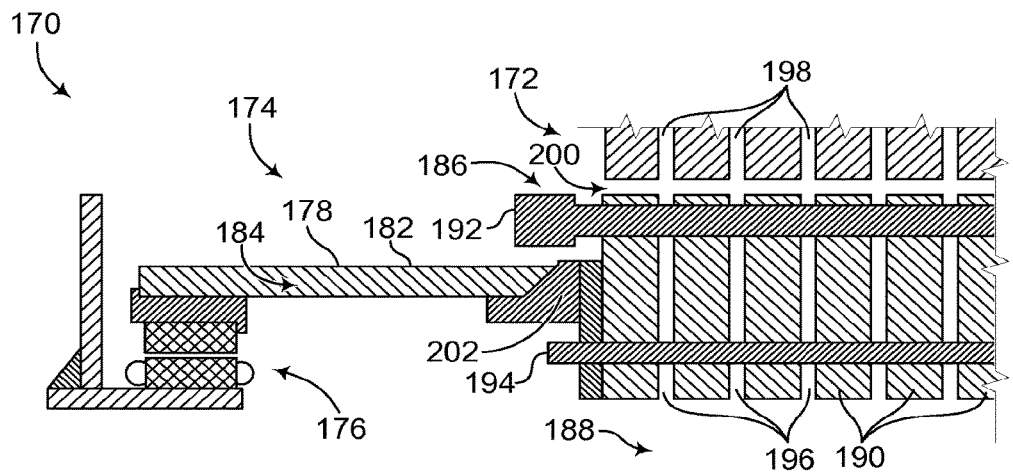
FIG. 13 is a schematic partial view of a nonexclusive illustrative example of an inner rotor electrical machine that includes another nonexclusive illustrative example of an electrical machine rotor.

A nonexclusive illustrative example of an inner rotor electrical machine is shown generally at 170 in FIG. 13. Unless otherwise specified, the electrical machine 170 and/ or its various components and parts may, but is not required to, contain at least one of the structures, components, functionalities, and/or variations described, illustrated, and/ or incorporated herein. As may be understood, the components and concepts discussed herein with regard to the electrical machine 170 may be used with any suitable type of electrical machine, nonexclusive illustrative examples of which include cage rotor induction machines, wound rotor induction machines, wound rotor synchronous machines, synchronous reluctance machines, switched reluctance machines, permanent magnet machines, permanent magnet assisted synchronous reluctance machines, and permanent magnet synchronous machines.

In the illustrated example, the electrical machine 170 includes a stator 172, a nonexclusive illustrative example of an electrical machine rotor 174 that extends through the stator 172, and a suitable bearing 176, which may be or include a magnetic bearing configured to magnetically levitate or support the rotor 174 for rotation relative to the stator 172.

Nonexclusive illustrative examples of suitable magnetic bearings include active and passive magnetic bearings, which may provide electromagnetic or electrodynamic suspension. Examples of magnetic bearings are disclosed in U.S. Pat. Nos. 3,787,100; 4,763,032 and 6,831,385, the complete disclosures of which are incorporated by reference in their entirety for all purposes.

As shown in FIG. 13, the rotor 174 includes a hollow non-magnetic shaft 178 that extends along an axis 180 and has an outside diameter or exterior surface 182, wherein the exterior surface defines a shaft space 184 extending along the axis 180. The rotor 174 may include an active region 186, at least a portion of which may be disposed within the shaft space 184, with the active region comprising a substantially annular structure arranged around and/or along the axis 180 and having a central opening 188 extending therethrough along the axis.

As shown in the example presented in FIG. 13, the active region 186 of the rotor 174, which may be configured for use in a squirrel cage electrical machine, may include a plurality of spaced apart lamination packets 190 arranged around and/or along the axis 180, with a plurality of copper bars 192 and a plurality of threaded rods 194 extending axially through the plurality of lamination packets 190. By way of non-limiting example, the plurality of spaced apart lamination packets 190 may each have an axial length or thickness of about 40 mm to about 500 mm, with a void or gap 196 of about 5 mm to about 15 mm between adjacent ones of the plurality of spaced apart lamination packets 190. In some examples, the plurality of spaced apart lamination packets 190 may each have an axial length or thickness of about 42 mm, with a void or gap 196 of about 8 mm between adjacent ones of the plurality of spaced apart lamination packets 190. Suitable structures, which may be substantially radially oriented, may be provided between adjacent ones of the plurality of spaced apart lamination packets 190 so as to maintain the spacing therebetween.

The gaps 196 may effectively provide a plurality of coolant passages that extend within the active region and are configured to permit substantially radial coolant flow between adjacent ones of the plurality of spaced apart lamination packets 190 and within or even through the active region 186 and at least partially within the shaft space. In some examples, such a rotor 174 may be incorporated into an electrical machine where the gaps 196 between adjacent ones of the plurality of spaced apart lamination packets 190 are substantially axially aligned with corresponding vents or passages 198 in the stator 172, such that radial coolant flow from within the rotor shaft space 184 may cross the machine's air gap 200 and enter the vents or passages 198 in the stator. In some examples, the active region 186 may be configured to permit substantially axial coolant flow within or even through the shaft space 184, such as through the central opening 188. As may be understood, the coolant flow within the active regions of the rotor 174 and the stator 172, as provided by the gaps 196, the passages 198 and/or the central opening 188, may provide sufficient heat dissipation so as to support relatively high loss densities within the electrical machine 170.

In some examples, the rotor 174 may include a connection region 202 disposed between the shaft 178 and the active region 186. The connection region 202 may include any suitable structure configured to support the active region 186 relative to the shaft 178 and to transfer torque therebetween. In some examples, the connection region 202 may include any suitable structure configured to permit or support coolant flow therethrough, such as from within the shaft space 184 to the exterior of the rotor 174. Nonexclusive illustrative examples of such structures may include a lattice-structure and/or a plurality of fins and/or radially oriented openings extending at least partially radially through the connection region 202. In some examples, the connection region 202 and/or the structures or components thereof may be configured to provide and/or assist with coolant flow outside the rotor 174 and/or outside the shaft space 184. For example, radial coolant flow out through and/or from the connection region 202 may be directed towards, and/or used to assist with cooling, various portions of the electrical machine 170, such as the airgap 200 and/or the stator end windings.

In some examples, the electrical machine 170 and its rotor 174 may be configured for asymmetric coolant flow therethrough. For example, coolant may enter the shaft 178 through an open end, pass axially through the connection region 202, into the active region 186 via the central opening 188 and then radially through the active region via the gaps 196. In such an example, some of the coolant flow may radially exit the rotor via the connection region 202 and/or some of the coolant flow may axially exit the rotor through an opposite end of the rotor.

In some examples, the electrical machine 170 and its rotor 174 may be configured for symmetric coolant flow therethrough. For example, the rotor may include corresponding shafts 178 disposed on opposite ends of the active region 186 with an opposed pair of connection regions 202 therebetween. In such an example, opposed coolant flows may enter through the open ends of both of the pair of shafts, pass through the connection regions 202, with some of the coolant flow radially exiting through the connection regions 202. The remainder of the coolant flows would then pass into the active region 186 via the central opening 188 and then exit the rotor radially through the active region via the gaps 196 and into the stator passages 198 and/or the machine's air gap 200.

Figure 14:
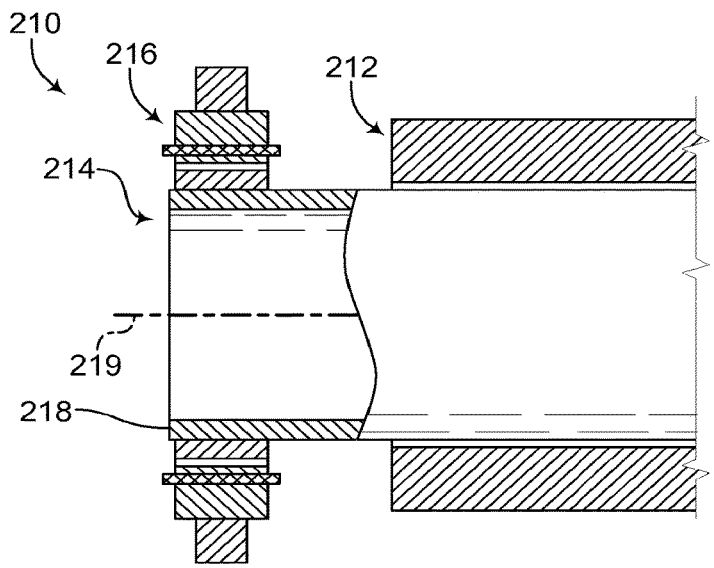
FIG. 14 is a longitudinal axial partial section view of another nonexclusive illustrative example of an inner rotor electrical machine incorporating a nonexclusive illustrative example of an electrical machine rotor.

Another nonexclusive illustrative example of an inner rotor electrical machine is shown generally at 210 in FIG. 14. Unless otherwise specified, the electrical machine 210 and/or its various components and parts may, but is not required to, contain at least one of the structures, components, functionalities, and/or variations described, illustrated, and/or incorporated herein. In the illustrated example, the inner rotor electrical machine 210 includes a stator 212, a nonexclusive illustrative example of an electrical machine rotor 214 that extends through the stator 212, and a suitable bearing 216, which may be or include a magnetic bearing, such as an active or passive magnetic bearing configured to magnetically levitate or support the rotor 214 for rotation relative to the stator 212. The rotor 214 includes a hollow non-magnetic shaft 218 that extends along an axis 219. In some examples, the rotor 214 may be any of the electrical machine rotors 20, 70, 84, 98, 114, 130, 174 disclosed above or may include any suitable combination of the features thereof.

Figure 15:
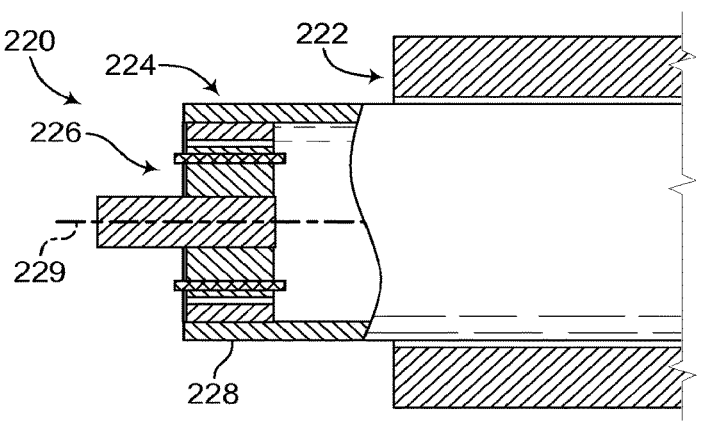
FIG. 15 is a longitudinal axial partial section view of another nonexclusive illustrative example of an inner rotor electrical machine incorporating a nonexclusive illustrative example of an electrical machine rotor.

Another nonexclusive illustrative example of an inner rotor electrical machine is shown generally at 220 in FIG. 15. Unless otherwise specified, the electrical machine 220 and/or its various components and parts may, but is not required to, contain at least one of the structures, components, functionalities, and/or variations described, illustrated, and/or incorporated herein. In the illustrated example, the inner rotor electrical machine 220 includes a stator 222, a nonexclusive illustrative example of an electrical machine rotor 224 that extends through the stator 222, and a suitable bearing 226, which may be or include a magnetic bearing, such as an active or passive magnetic bearing configured to magnetically levitate or support the rotor 224 for rotation relative to the stator 222. The rotor 224 includes a hollow non-magnetic shaft 228 that extends along an axis 229. In some examples, the rotor 224 may be any of the electrical machine rotors 20, 70, 84, 98, 114, 130, 174 disclosed above or may include any suitable combination of the features thereof.

Figure 16:
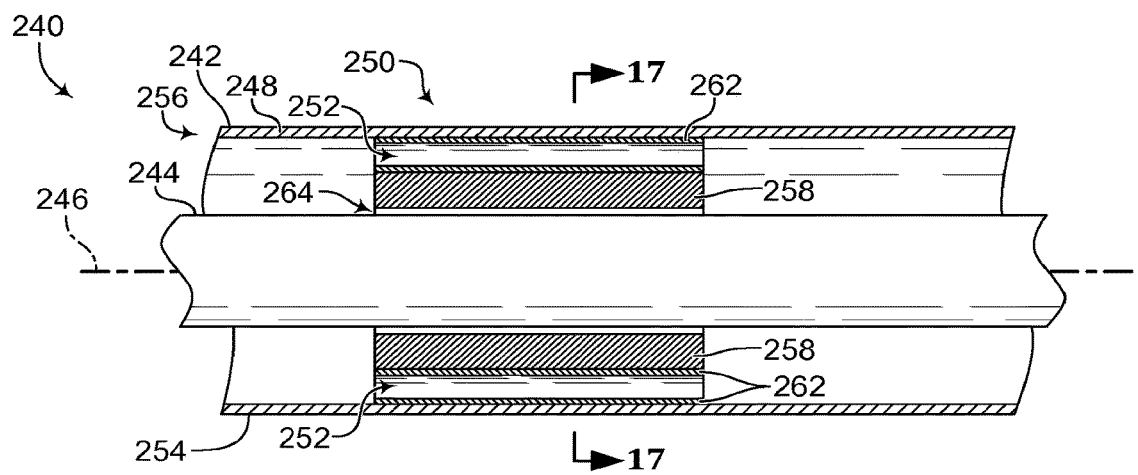
FIG. 16 is a longitudinal axial section partial view of a nonexclusive illustrative example of an outer rotor electrical machine that includes another nonexclusive illustrative example of an electrical machine rotor.

A nonexclusive illustrative example of an outer rotor electrical machine is shown generally at 240 in FIG. 16. Unless otherwise specified, the electrical machine 240 and/or its various components and parts may, but is not required to, contain at least one of the structures, components, functionalities, and/or variations described, illustrated, and/or incorporated herein. In the illustrated example, the outer rotor electrical machine 240 includes a nonexclusive illustrative example of an electrical machine rotor 242, which is configured as an outer rotor, and a stator 244, which extends through the rotor 242 and along the axis 246. As may be understood, the electrical machine 240 may include a suitable bearing configured to support the rotor 242 for rotation relative to the stator 244. In some examples, the bearing may be or include a magnetic bearing, such as an active or passive magnetic bearing, which is configured to magnetically levitate or support the rotor 242 for rotation relative to the stator 244.

Figure 17:
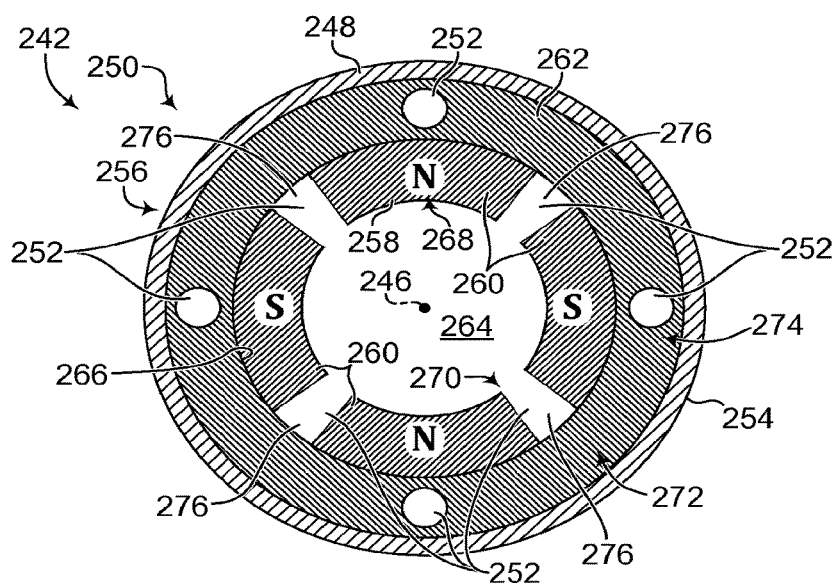
FIG. 17 is a cross-section of the electrical machine rotor of FIG. 16, taken generally along line 17-17 in FIG. 16, and schematically illustrating nonexclusive illustrative examples of coolant passages extending through the active region of the rotor.

In the illustrated example, the electrical machine rotor 242 includes a hollow non-magnetic shaft 248, an active region 250, and a plurality of coolant passages 252 extending within the active region. As shown in FIGS. 16 and 17, the hollow non-magnetic shaft 248 extends along the axis 246 and has an outside diameter corresponding to its exterior surface 254, wherein the exterior surface 254 defines a shaft space 256 extending along the axis 246.

The active region 250 may be an electromagnetically active region that includes any suitable combination and/or arrangement of suitable components, such as may be appropriate for a particular type of electrical machine. Nonexclusive illustrative examples of suitable components for the active region 250 include, without limitation, permanent magnets, copper conductors, aluminum conductors, electrical steel, and the like. In the nonexclusive illustrative example shown in FIGS. 16 and 17, the active region 250 includes a magnet portion 258, which may comprise a plurality of permanent magnets 260 and a backiron 262. In some examples, the backiron 262 may be in the form of a suitably configured backiron package arranged at least partially around the interior surface of the shaft 248. As shown in the nonexclusive illustrative example presented in FIGS. 16 and 17, the active region 250 may be a substantially annular structure arranged around and/or along the axis 246 and having a central opening 264 that extends through the active region along the axis 246.

The particular configuration of the magnet portion 258 illustrated in FIG. 17, including the permanent magnets 260, should be understood as a schematic representation. In particular, the magnet portion 258 may be fabricated from any suitable number and configuration of individual permanent magnets arranged to form an overall generally or substantially annular region of permanent magnets. Thus, the magnet portion 258 illustrated in FIGS. 16 and 17 may include any suitable number or combination of individual permanent magnets, and/or layers of permanent magnets, arranged at least partially around the interior surface 266 of the backiron 262.

The permanent magnets 260 may be arranged, oriented and/or configured to provide a suitable number of magnetic poles for the rotor 242. As shown in FIG. 17, the magnet portion 258 may be configured to provide four poles or two north-south pole pairs, as generally indicated by the letters "N" and "S" in FIG. 17. Although illustrated with two pole pairs it is within the scope of the present disclosure for the magnet portion 258 to have any suitable number of poles or pole pairs, such as three pole pairs, or even four or more pole pairs.

The coolant passages 252 may be or include any suitable structure, feature or combination thereof, such as conduits, tubes, ducts, channels, apertures, openings, gaps, orifices, holes or voids, that is or are configured to permit or support the circulation, movement or flow of a suitable coolant fluid, such as air or other low density coolant fluid, through the coolant passages. At least some of the coolant passages 252 may extend substantially adjacent to, or even at least partially through, at least a portion of the active region 250. For example, at least some of the coolant passages 252 may extend substantially adjacent to, or even at least partially through, suitable structures and/or components within the active region 250, such as the permanent magnets 260, copper conductors, aluminum conductors, electrical steel, or the like. As shown in the nonexclusive illustrative example presented in FIGS. 16 and 17, at least some of the coolant passages 252 may extend substantially adjacent to, or even at least partially through, at least a portion of the backiron 262, the magnet portion 258 and/or at least one of the permanent magnets 260. As may be understood, the coolant passages 252 may provide an effective increase in heat dissipating surface area within or for the magnets and/or the backiron. Accordingly, the coolant passages 252 may permit coolant flow in close thermal proximity to the structures and/or components of the active region 250, which may provide an improved heat dissipation ability for the rotor, even when used with low density coolant fluids such as air or other cooling gases. Thus, inclusion of the coolant passages 252 extending within the active region 250 and within the shaft space 256 may limit or even reduce temperature rises within the rotor and/or its various components that would otherwise result from equivalent losses.

As shown in FIGS. 1 and 2, at least some of the passages 252 may be substantially axially aligned and extend through the active region 250 and within the shaft space 256 substantially parallel to the axis 246 of the rotor. In some examples, at least some of the passages may be extended helically or skew relative to the axis, which may reduce harmonics in the voltage output of the machine.

In some examples, the particular locations and/or geometry of the coolant passages 252 within the magnet portion 258 and/or the back iron 262 of the active region 250 may correspond to magnetic and/or material optimization within the active region. In particular, relatively less important and/or excess portions of the magnet portion 258 and/or the back iron 262, such as those portions having relatively lower magnetic flux therethrough, may be omitted or removed from the magnet portion 258 and/or the back iron 262 so as to form and/or provide at least some of the coolant passages 252. For example, at least some of the coolant passages 252 may extend through reduced flux density portions of the active region 250, such as through reduced flux portions of the magnet portion 258 and/or reduced flux portions of the back iron 262. In particular, as may be understood, the active region 250 may include both higher flux density portions and reduced flux density portions, where the reduced flux density portions have a lower magnetic flux density than the higher flux density portions. For example, the magnet portion 258 may include higher flux density portions 268 proximate the poles and reduced flux density portions 270 in the interpole portions. The backiron 262 may correspondingly include higher flux density portions 272 in the interpole portions and reduced flux density portions 274 proximate the poles. As shown in FIG. 17, at least some of the passages may extend through interpole portions of the active region, such as where the passages 276 extend through the reduced flux density interpole portions of magnet portion 258.

As may be further understood, omitting or removing portions of the magnet portion 258 and/or the back iron 262 may also reduce the weight of the rotor and reduce the associated material costs.

The coolant passages 252 may be formed through or within the magnet portion 258 and/or the back iron 262 using any suitable fabrication process or combination of processes. For example, at least some of the coolant passages 252 may be formed substantially through a single magnet and/or through a single piece or lamination of the backiron, either during fabrication of the backiron or by way of a subsequent operation. At least some of the coolant passages 252 may be formed between adjacent magnets, adjacent portions of the backiron, and/or between a magnet and the backiron. For example, a first one of the adjacent parts may be formed or otherwise provided with a suitable channel or indentation extending along a mating surface that will be proximate a corresponding mating surface of a second one of the adjacent parts, such that when the mating surfaces are brought together, the channel or indentation may form a coolant passage extending between the adjacent parts. In some examples, the corresponding mating surfaces of the first and second ones of the adjacent parts may both include channels or indentations thereon. In some examples, at least some of the coolant passages may be formed between adjacent ones of the magnets 260 within the magnet portion 258, such as where the coolant passages 276 correspond to a void where one or more magnets or portions thereof were omitted or removed from the magnet portion 258.

The coolant passages 252 may have any suitable cross-sectional shape, which may, in some examples, correspond to how the particular coolant passages was formed or otherwise created. For example, as shown in FIG. 17, at least some of the coolant passages 252 formed substantially through a single piece or lamination of the backiron, as well as at least some of the coolant passages formed between corresponding mating surfaces of adjacent parts, may have a substantially circular cross-section. In some examples, at least some of the coolant passages 276 formed between adjacent magnets 260 may have a cross-section corresponding to the shape of the omitted or removed magnet, as shown in FIG. 17.

Figure 18:
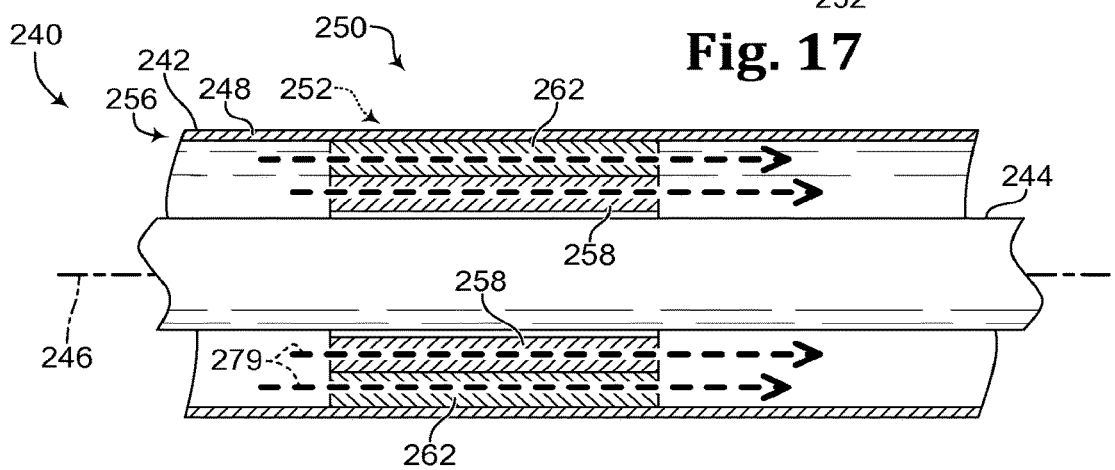
FIG. 18 is a longitudinal axial section partial view of the outer rotor electrical machine of FIG. 16, shown with a schematic representation of coolant flow through the rotor.

FIG. 18 provides a schematic representation of a nonexclusive illustrative example of coolant flow through the rotor 242 of the outer rotor electrical machine 240. For the purposes of clarity, particular coolant passages, some of which may not be visible in the particular cross-section provided, are not explicitly shown in FIG. 18. Thus, when arrows corresponding to the particular coolant flow paths illustrated in FIG. 18 extend across the magnet portion 258 and/or the back iron 262 of the illustrated active region 250, it should be understood that the arrows schematically represent coolant flow through coolant passages 252 that extend within and/or through the illustrated magnet portion, back iron and/or active region. As suggested by the arrows 279 in FIG. 18, at least some of the coolant passages 252 are configured to permit substantially axial coolant flow within or even through the active region 250 and within the shaft space 256. In some examples, of the rotor 242 illustrated in FIGS. 16-18, both ends of the rotor may be substantially open so as to permit substantially axial flow through the entire length of the rotor, entering through a first end of the shaft, passing through the shaft space and the active portion, and exiting through a second end of the shaft. As may be understood, the coolant flow schematically illustrated in FIG. 18, which passes through the active region 250 in a single direction, may provide an asymmetric coolant within the rotor 242.

Figure 19:
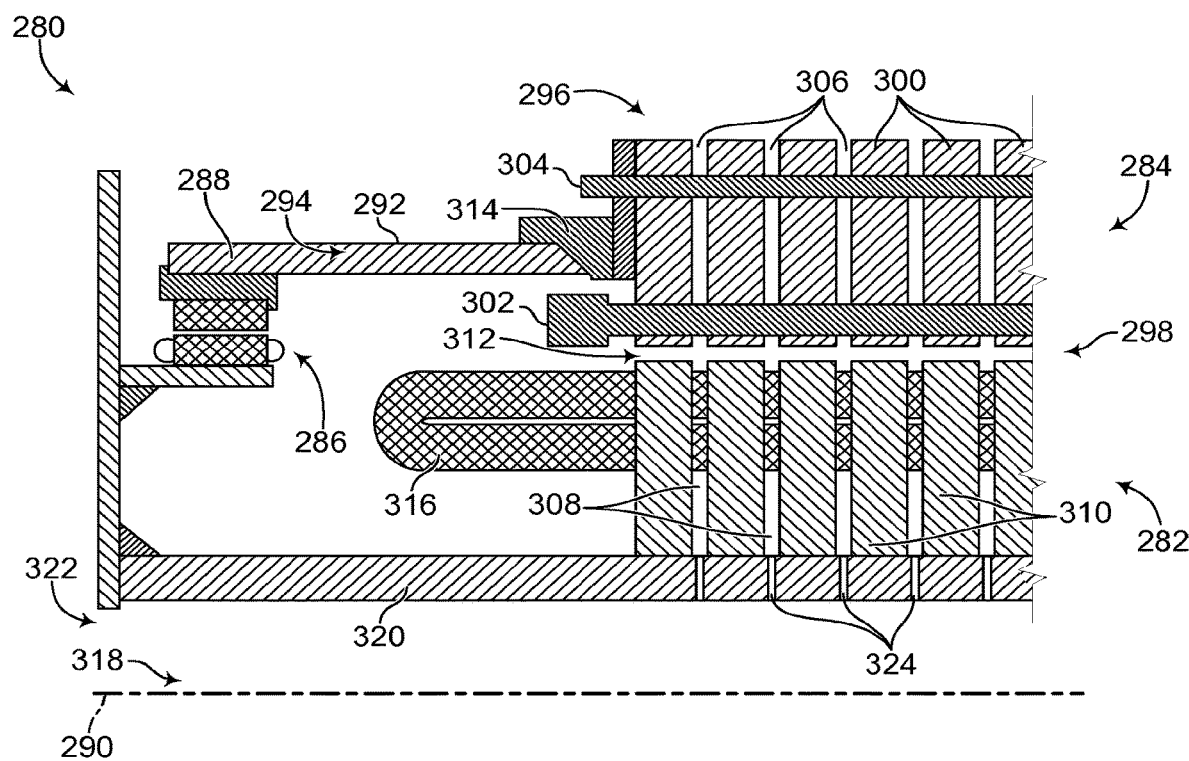
FIG. 19 is a schematic partial view of another nonexclusive illustrative example of an outer rotor electrical machine that includes another nonexclusive illustrative example of an electrical machine rotor.

Another nonexclusive illustrative example of an outer rotor electrical machine is shown generally at 280 in FIG. 19. Unless otherwise specified, the electrical machine 280 and/or its various components and parts may, but is not required to, contain at least one of the structures, components, functionalities, and/or variations described, illustrated, and/or incorporated herein. As may be understood, the components and concepts discussed herein with regard to the electrical machine 280 may be used with any suitable type of electrical machine, nonexclusive illustrative examples of which include cage rotor induction machines, wound rotor induction machines, wound rotor synchronous machines, synchronous reluctance machines, switched reluctance machines, permanent magnet machines, permanent magnet assisted synchronous reluctance machines, and permanent magnet synchronous machines.

In the illustrated example, the electrical machine 280 includes a stator 282, a nonexclusive illustrative example of an electrical machine rotor 284, and a suitable bearing 286, which may be or include a magnetic bearing configured to magnetically levitate or support the rotor 284 for rotation relative to the stator 282. Nonexclusive illustrative examples of suitable magnetic bearings include active and passive magnetic bearings, which may provide electromagnetic or electrodynamic suspension.

As shown in FIG. 19, the rotor 284 includes a hollow non-magnetic shaft 288 that extends along an axis 290 and has an outside diameter or exterior surface 292 that defines a shaft space 294 extending along the axis 290. The rotor 284 may include an active region 296, at least a portion of which may be disposed within the shaft space 294. The active region 296 may comprise a substantially annular structure arranged around and/or along the axis 290 and having a central opening 298 extending therethrough along the axis, with the stator 282 extending through the central opening.

As shown in the example presented in FIG. 19, the active region 296 of the rotor 284 may include a plurality of spaced apart lamination packets 300 arranged around and/or along the axis 290, with a plurality of copper bars 302 and a plurality of threaded rods 304 extending axially through the plurality of lamination packets 300. By way of non-limiting example, the plurality of spaced apart lamination packets 300 may each have an axial length or thickness of about 40 mm to about 500 mm, with a void or gap 306 of about 5 mm to about 15 mm between adjacent ones of the plurality of spaced apart lamination packets 300. In some examples, the plurality of spaced apart lamination packets 300 may each have an axial length or thickness of about 42 mm, with a void or gap 306 of about 8 mm between adjacent ones of the plurality of spaced apart lamination packets 300. Suitable structures, which may be substantially radially oriented, may be provided between adjacent ones of the plurality of spaced apart lamination packets 300 so as to maintain the spacing therebetween.

The gaps 306 may effectively provide a plurality of coolant passages that extend within the active region and are configured to permit substantially radial coolant flow between adjacent ones of the plurality of spaced apart lamination packets 300 and within or even through the active region 296 and at least partially within the shaft space 294. In some examples, such a rotor 284 may be incorporated into an electrical machine where the gaps 306 between adjacent ones of the plurality of spaced apart lamination packets 300 are substantially axially aligned with corresponding vents or passages 308 in the stator 282 and between adjacent stator lamination packets 310, such that radial coolant flow from within the rotor shaft space 294 may cross the machine's air gap 312 and enter the passages 308 in the stator. As may be understood, the coolant flow within the active regions of the rotor 284 and the stator 282, as provided by the gaps 306 and/or the passages 308, may provide sufficient heat dissipation so as to support relatively high loss densities within the electrical machine 280.

In some examples, the rotor 284 may include a connection region 314 disposed between the shaft 288 and the active region 296. The connection region 314 may include any suitable structure configured to support the active region 296 relative to the shaft 288 and to transfer torque therebetween. In some examples, the connection region 314 may include any suitable structure configured to permit or support coolant flow therethrough, such as from within the shaft space 294 to the exterior of the rotor 284 and/or from the exterior of the rotor 284 to within the shaft space 294. Nonexclusive illustrative examples of such structures may include a lattice-structure and/or a plurality of fins and/or radially oriented openings extending at least partially radially through the connection region 314. In some examples, the connection region 314 and/or the structures or components thereof may be configured to provide and/or assist with coolant flow outside the active region 296. For example, radial coolant flow out through and/or from the connection region 314 may be used to support and/or cause coolant flow across and/or through various portions of the electrical machine 280, such as the airgap 312 and/or the stator end windings 316, so as to assist with cooling of those structures.

In some examples, the electrical machine 280 and its rotor 284 may be configured for asymmetric coolant flow therethrough. For example, coolant may enter the central passage 318 within the stator frame 320 through an open end 322, pass radially outward through the passages or openings 324 through the stator frame 320, through the passages 308 between adjacent stator lamination packets 310, across the machine's air gap 312, and through the gaps 306 between adjacent rotor lamination packets 300. In some examples, at least a portion of the coolant flow may pass along the machine's air gap 312 and then radially across or through the connection region 314. As may be understood, the coolant flow may radially exit the rotor 284 and/or the machine 280 through the gaps 306 and/or the connection region 314.

In some examples, the electrical machine 280 and its rotor 284 may be configured for symmetric coolant flow therethrough. For example, the rotor may include corresponding shafts 288 disposed on opposite ends of the active region 296, with an opposed pair of connection regions 314 therebetween. In such an example, opposed coolant flows may enter the central passage 318 through opposed open ends thereof, pass radially outward through the openings 324, through the passages 308, across the machine's air gap 312, and through the gaps 306 to radially exit the rotor 284 and/or the machine 280. In some examples, at least a portion of the coolant flow may pass along the machine's air gap 312 and then radially across or through the connection region 314 to exit the rotor 284 and/or the machine 280.

In some examples of the various electrical machine rotors disclosed herein and the electrical machines into which such rotors are incorporated, the incoming coolant flow to the rotor may also be considered such that the rotor may draw in a sufficient volume of coolant that is within a desired temperature range and/or is of a sufficiently low temperature. As may be understood, the coolant flow into the rotor and/or the electrical machine may be of a sufficient volume, and/or of a low enough temperature, such that sufficient heat energy may be added to the coolant so that the rotor and/or other components of the electrical machine may remain within desired temperature limits while avoiding excessive temperature rises or variations within the electrical machine.

The following paragraphs describe a nonexclusive illustrative example of methods of fabricating rotors for electrical machine, using the concepts and components disclosed herein. The actions of the disclosed methods may be performed in the order in which they are presented below. However, unless the context indicates otherwise, it is within the scope of this disclosure for the actions, either alone or in various combinations, to be performed before and/or after any of the other actions. It is further within the scope of this disclosure for the disclosed methods to omit one or more of the disclosed actions and/or to include one or more actions in addition to those disclosed herein.

Methods of fabricating rotors for electrical machines may include providing a hollow non-magnetic shaft extending along an axis and having an interior surface defining an interior, inserting a plurality of magnets into the interior of the shaft, arranging the magnets around the interior surface to define a central region extending along the axis, inserting a backiron package into the central region, and radially and plastically expanding the backiron package to urge and preload the magnets against the interior surface of the shaft. The radial and plastic expansion of the backiron package to urge and preload the magnets against the interior surface of the shaft may be configured such that the magnets are retained in contact with the interior surface of the shaft under one or more predetermined operating conditions or even under all desired or expected operating conditions.

In some examples, the methods may include fabricating the hollow non-magnetic shaft from a fiber reinforced composite material. For example, the methods may include tape or filament winding a suitable reinforcing fiber, such as carbon fiber or fiberglass or other suitable type of fiber, and resin onto a mandrel having an exterior surface, where the interior surface of the shaft is formed by the exterior surface of the mandrel. In some examples, the methods may include pultruding woven and/or unidirectional fibers through a suitable resin and through a heated die.

In some examples, radially and plastically expanding the backiron package to urge and preload the magnets against the interior surface of the shaft may include applying an axial compressive load to at least the backiron package. In some examples, an axial compressive load may be applied to at least some of the magnets. Nonexclusive illustrative examples of such methods are described in more detail in U.S. patent application Ser. No. 13/419,898, the complete disclosure of which is incorporated by reference in its entirety for all purposes.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a," "a first" or "the" element, or the equivalent thereof, should be understood to include incorporation of one or more such elements, neither requiring nor excluding two or more such elements, unless the context clearly indicates otherwise. As used herein, the terms "having", "containing", "including", "comprising" and the like are open ended terms that indicate the presence of stated elements or features, but do not preclude additional elements or features.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A method of fabricating a rotor for an electrical machine, comprising:
   providing a hollow non-magnetic shaft extending along an axis and having an interior surface defining an interior;
   inserting a plurality of magnets into the interior of the shaft;
   arranging the magnets around the interior surface to define a central region extending along the axis;
   inserting a backiron package into the central region; and
   radially and plastically expanding the backiron package to urge and preload the magnets against the interior surface of the shaft.

2. The method of claim 1, comprising fabricating the hollow non-magnetic shaft from a fiber reinforced composite material.

3. The method of claim 2, wherein fabricating the hollow non-magnetic shaft from a fiber reinforced composite material comprises filament winding reinforcing fiber and resin onto a mandrel having an exterior surface, and the interior surface of the shaft is formed by the exterior surface of the mandrel.

4. The method of claim 1, wherein radially and plastically expanding the backiron package to urge and preload the magnets against the interior surface of the shaft comprises applying an axial compressive load to at least the backiron package.

5. The method of claim 1, wherein the shaft defines a shaft space extending along the axis and further comprising providing an active region that is at least partially disposed within the shaft space.

6. The method of claim 5, wherein the active region is an electromagnetically active region comprising a plurality of permanent magnets.

7. The method of claim 6, further comprising forming a plurality of coolant passages extending within the active region.

8. The method of claim 7, wherein at least some of the coolant passages extend substantially adjacent to at least a portion of at least one of the permanent magnets.

9. The method of claim 7, wherein at least some of the coolant passages are configured to permit substantially radial coolant flow within the active region within the shaft space.

10. The method of claim 7, wherein at least some of the coolant passages are configured to permit substantially axial coolant flow within the active region within the shaft space.

11. The method of claim 7, wherein at least some of the passages extend through interpole portions of the active region.

12. The method of claim 7, wherein at least some of the passages extend parallel to the axis and have an elongated cross-section transverse to the axis, and the elongated cross-section is arranged approximately parallel to local magnetic flux lines.

13. The method of claim 5, wherein the active region is a substantially annular structure arranged around the axis and having a central opening extending therethrough along the axis.

14. The method of claim 5, wherein the active region includes higher flux density portions and reduced flux density portions, the reduced flux density portions have a lower magnetic flux density than the higher flux density portions, and at least some of the passages extend through reduced flux density portions of the active region.

15. The method of claim 1, further comprising securing the shaft relative to the active region at a connection region that includes a plurality of openings extending radially therethrough.

16. The method of claim 15, wherein the active region comprises a steel structure extending along the axis to an end, and the connection region is cast onto the active region and extends along the axis from the end.

17. The method of claim 1, further comprising incorporating the rotor into an electrical machine that includes a stator.

18. The method of claim 17, further comprising magnetically levitating the rotor relative to the stator with a magnetic bearing.

19. The method of claim 17, wherein the electrical machine is an inner rotor electrical machine.

20. The method of claim 17, wherein the electrical machine is an outer rotor electrical machine.

* * * * *